US012782732B2

(12) United States Patent
Keilbach et al.

(10) Patent No.: US 12,782,732 B2
(45) Date of Patent: Nov. 3, 2026

(54) DISPLAYS HAVING PROGRESSIVE LENSES

(71) Applicant: Apple Inc., Cupertino, CA (US)

(72) Inventors: Kevin A Keilbach, Boulder, CO (US); Barbara J Kruse, San Francisco, CA (US); Vikrant Bhakta, Santa Clara, CA (US); Hyungryul Choi, San Jose, CA (US)

(73) Assignee: Apple Inc., Cupertino, CA (US)

( * ) Notice: Subject to any disclaimer, the term of this patent is extended or adjusted under 35 U.S.C. 154(b) by 297 days.

(21) Appl. No.: 18/508,004

(22) Filed: Nov. 13, 2023

(65) Prior Publication Data

US 2024/0201500 A1 Jun. 20, 2024

Related U.S. Application Data

(60) Provisional application No. 63/433,069, filed on Dec. 16, 2022.

(51) Int. Cl.
*G02B 27/01* (2006.01)
*G02B 6/26* (2006.01)

(52) U.S. Cl.
CPC ......... *G02B 27/0172* (2013.01); *G02B 6/262* (2013.01); *G02B 2027/011* (2013.01)

(58) Field of Classification Search
CPC ...... G02B 27/01; G02B 6/26; G02B 27/0172; G02B 6/262; G02B 2027/011; G02B 2027/0178; G02B 27/0101; G02B 2027/0118; G02B 2207/123; G02B 27/0018; G02B 2027/0125; G02B 2027/015; B60K 35/22; B60K 35/234; B60K 35/235
USPC .......................................................... 359/618
See application file for complete search history.

(56) References Cited

U.S. PATENT DOCUMENTS

| | | | | |
|---|---|---|---|---|
| 11,269,180 | B2 | 3/2022 | Browy et al. | |
| 11,500,143 | B2 | 11/2022 | Danziger | |
| 2015/0277123 | A1 | 10/2015 | Chaum et al. | |
| 2017/0285348 | A1* | 10/2017 | Ayres | G02B 6/0016 |
| 2018/0129052 | A1 | 5/2018 | Morrison | |
| 2020/0150424 | A1* | 5/2020 | Browy | G02B 5/30 |
| 2020/0174284 | A1 | 6/2020 | Chan et al. | |
| 2020/0225477 | A1 | 7/2020 | Chan et al. | |
| 2021/0132387 | A1* | 5/2021 | Stevens | G02B 26/004 |
| 2021/0141212 | A1 | 5/2021 | Jacoby et al. | |
| 2021/0405378 | A1 | 12/2021 | Choi et al. | |

(Continued)

*Primary Examiner* — William R Alexander
*Assistant Examiner* — Kuei-Jen L Edenfield
(74) *Attorney, Agent, or Firm* — Treyz Law Group, P.C.; Michael H. Lyons

(57) ABSTRACT

A display may include a waveguide that directs image light towards an eye box within a field of view (FOV). A first lens may transmit world light to the waveguide and a second lens may transmit the world light and the image light to the eye box. One or more surfaces of the first and second lenses may collectively have a first region with a first optical power, a second region with a second optical power, a corridor with gradient optical power and constant astigmatism, and blending regions with variable astigmatism. The second region may be shifted downwards in elevation angle, the corridor may be elongated, and/or the blending regions may be disposed away from the FOV to prevent the blending regions from introducing astigmatism to the image light at the eye box.

20 Claims, 6 Drawing Sheets

(56) References Cited

U.S. PATENT DOCUMENTS

| | | | | |
|---|---|---|---|---|
| 2022/0187595 | A1 | 6/2022 | Mityashin et al. | |
| 2022/0229300 | A1 | 7/2022 | Ashkenazi et al. | |
| 2022/0300073 | A1 | 9/2022 | Reshidko et al. | |
| 2023/0258937 | A1 | 8/2023 | Lam et al. | |
| 2023/0324694 | A1 | 10/2023 | Toride | |
| 2024/0036342 | A1* | 2/2024 | Ouderkirk ................ | G02B 5/09 |

* cited by examiner

DISPLAYS HAVING PROGRESSIVE LENSES

This application claims the benefit of U.S. Provisional Patent Application No. 63/433,069, filed Dec. 16, 2022, which is hereby incorporated by reference herein in its entirety.

BACKGROUND

This disclosure relates to optical systems such as optical systems in electronic devices having displays.

Electronic devices can include displays that provide images near the eyes of a user. Such electronic devices often include virtual or augmented reality headsets with displays having optical elements that allow users to view the displays overlaid with world light. If care is not taken, such optical systems might not exhibit desired levels of optical performance for viewing the displays and/or the world light.

SUMMARY

An electronic device may have a display system for providing image light to eye boxes. The display system may include waveguides. Projectors may generate image light containing a virtual object. Input couplers may couple the image light into the waveguides. Output couplers may couple the image light out of the waveguides and towards the eye boxes. The eye boxes may have a field of view (FOV). The output couplers may also pass world light from external objects to the eye boxes within the FOV.

A first lens may transmit the world light to the output coupler. The output coupler may transmit the world light. A second lens may transmit the world light and the image light to the eye box. One or more surfaces of the first and second lenses may collectively have a first region overlapping a first range of elevation angles, a second region overlapping a second range of elevation angles lower than the first range of elevation angles, a corridor region overlapping a third range of elevation angles between the first and second ranges of elevation angles, and blending regions around the corridor region and/or the second region. The first range of elevation angles may overlap the FOV. At least some of the third range of elevation angles may overlap the FOV. At least some of the second range of elevation angles may overlap the FOV or the second range of elevation angles may be non-overlapping with respect to the FOV.

The first region may have a first radius of curvature to impart the world light and optionally the image light with a first optical power. The second region may have a second radius of curvature to impart the world light and optionally the image light with a second optical power. The corridor region may have gradient optical power and constant astigmatism. The blending regions may have variable astigmatism. The second region may be shifted downwards in elevation angle, the corridor may be elongated, and/or the blending regions may be formed away from the FOV to prevent the blending regions from introducing astigmatism to the image light at the eye box.

DETAILED DESCRIPTION

Figure 1:
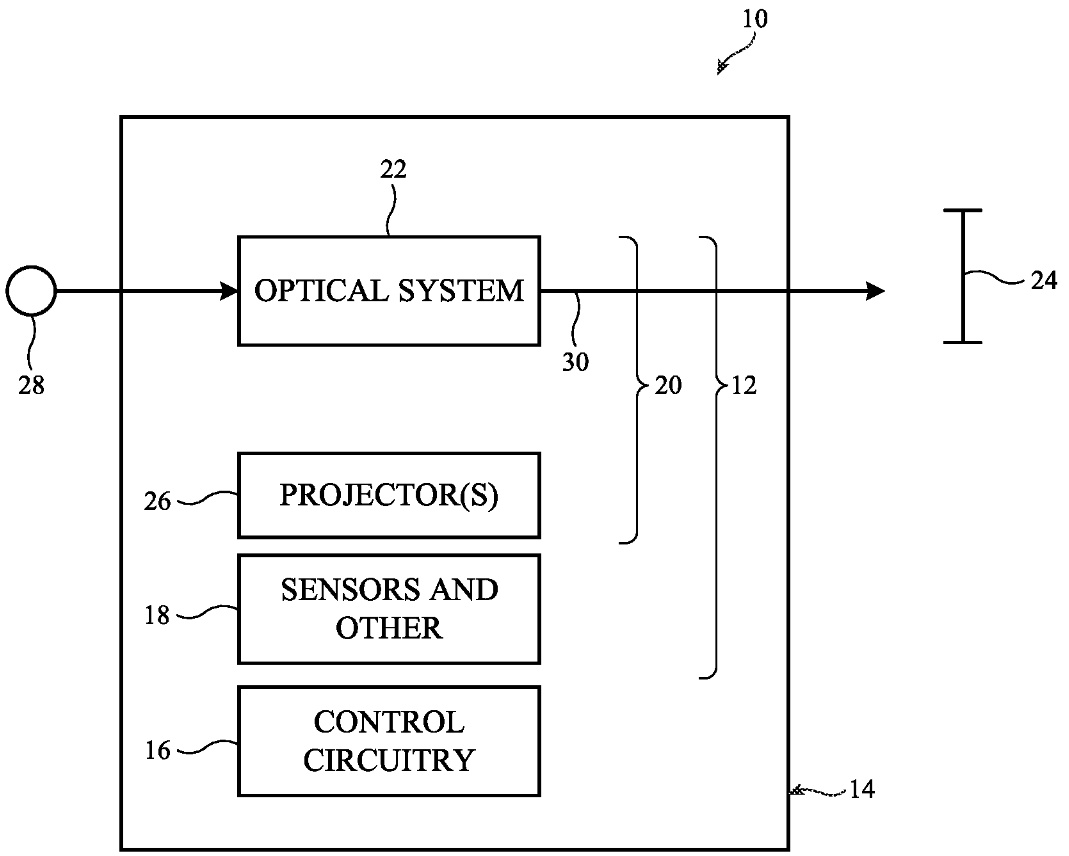
FIG. 1 is a diagram of an illustrative system having a display in accordance with some embodiments.

System 10 of FIG. 1 may be an electronic device such as a head-mounted device having one or more displays. The displays in system 10 may include near-eye displays 20 mounted within support structure such as housing 14. Housing 14 may have the shape of a pair of eyeglasses or goggles (e.g., supporting frames), may form a housing having a helmet shape, or may have other configurations to help in mounting and securing the components of near-eye displays 20 on the head or near the eye of a user. Near-eye displays 20 may include one or more display projectors such as projectors 26 (sometimes referred to herein as display modules 26) and one or more optical systems such as optical systems 22. Projectors 26 may be mounted in a support structure such as housing 14. Each projector 26 may emit image light 30 that is redirected towards a user's eyes at eye box 24 using an associated one of optical systems 22. Image light 30 may be, for example, visible light (e.g., including wavelengths from 400-700 nm) that contains and/or represents something viewable such as a scene or object (e.g., as modulated onto the image light using the image data provided by the control circuitry to the display module). Eye box 24 may sometimes be referred to herein as viewing region 24, viewing box 24, or display region 24.

The operation of system 10 may be controlled using control circuitry 16. Control circuitry 16 may include storage and processing circuitry for controlling the operation of system 10. Control circuitry 16 may include storage such as hard disk drive storage, nonvolatile memory (e.g., electrically-programmable-read-only memory configured to form a solid state drive), volatile memory (e.g., static or dynamic random-access-memory), etc. Processing circuitry in control circuitry 16 may include one or more processors (e.g., microprocessors, microcontrollers, digital signal processors, baseband processors, etc.), power management units, audio chips, graphics processing units, application specific integrated circuits, and other integrated circuits. Software code may be stored on storage in control circuitry 16 and run on processing circuitry in control circuitry 16 to implement operations for system 10 (e.g., data gathering operations, operations involving the adjustment of components using control signals, image rendering operations to produce image content to be displayed for a user, etc.).

System 10 may include input-output circuitry such as input-output devices 12. Input-output devices 12 may be used to allow data to be received by system 10 from external equipment (e.g., a tethered computer, a portable device such as a handheld device or laptop computer, or other electrical equipment) and to allow a user to provide head-mounted device 10 with user input. Input-output devices 12 may also be used to gather information on the environment in which system 10 (e.g., head-mounted device 10) is operating. Output components in devices 12 may allow system 10 to provide a user with output and may be used to communicate with external electrical equipment. Input-output devices 12 may include sensors and other components 18 (e.g., image sensors for gathering images of real-world object that are digitally merged with virtual objects on a display in system 10, accelerometers, depth sensors, light sensors, haptic output devices, speakers, batteries, wireless communications circuits for communicating between system 10 and external electronic equipment, etc.).

Projectors 26 may include liquid crystal displays, light-emitting diode displays, laser-based displays, or displays of other types. Projectors 26 may include light sources, emissive display panels (e.g., micro light-emitting diode (uLED) panels), transmissive display panels (spatial light modulators) that are illuminated with illumination light from light sources to produce image light, reflective display panels (spatial light modulators) such as digital micromirror display (DMD) panels and/or liquid crystal on silicon (LCOS) display panels that are illuminated with illumination light from light sources to produce image light 30, etc.

Optical systems 22 may form lenses that allow a viewer (see, e.g., a viewer's eyes at eye box 24) to view images on display(s) 20. There may be two optical systems 22 (e.g., for forming left and right lenses) associated with respective left and right eyes of the user. A single display 20 may produce images for both eyes or a pair of displays 20 may be used to display images. In configurations with multiple displays (e.g., left and right eye displays), the focal length and positions of the lenses formed by system 22 may be selected so that any gap present between the displays will not be visible to a user (e.g., so that the images of the left and right displays overlap or merge seamlessly).

If desired, optical system 22 may contain components (e.g., an optical combiner formed from reflective components, diffractive components, a waveguide, a direct view optical combiner, etc.) to allow real-world light (sometimes referred to as world light, external light, or scene light) from real-world objects such as real-world (external) object 28 from the scene (environment) in front of or around device 10 to be combined optically with virtual (computer-generated) images such as virtual images in the image light 30 emitted by projector(s) 26. In this type of system, which is sometimes referred to as an augmented reality system, a user of system 10 may view both real-world content (e.g., world light from real-world object 28) and computer-generated content that is overlaid on top of the real-world content. Camera-based augmented reality systems may also be used in device 10 (e.g., in an arrangement in which a camera captures real-world images of real-world object 28 and this content is digitally merged with virtual content at optical system 22).

System 10 may, if desired, include wireless circuitry and/or other circuitry to support communications with a computer or other external equipment (e.g., a computer that supplies display 20 with image content). During operation, control circuitry 16 may supply image content to display 20. The content may be remotely received (e.g., from a computer or other content source coupled to system 10) and/or may be generated by control circuitry 16 (e.g., text, other computer-generated content, etc.). The content that is supplied to display 20 by control circuitry 16 may be viewed by a viewer at eye box 24.

If desired, system 10 may include an optical sensor. The optical sensor may be used to gather optical sensor data associated with a user's eyes at eye box 24. The optical sensor may, for example, be a gaze tracking sensor that gathers optical sensor data such as gaze image data (gaze tracking image data or gaze tracking sensor data) from a user's eye at eye box 24. Control circuitry 16 may process the optical sensor data to identify and track the direction of the user's gaze in real time. Control circuitry 16 may perform any desired operations based on the tracked direction of the user's gaze over time.

Figure 2:
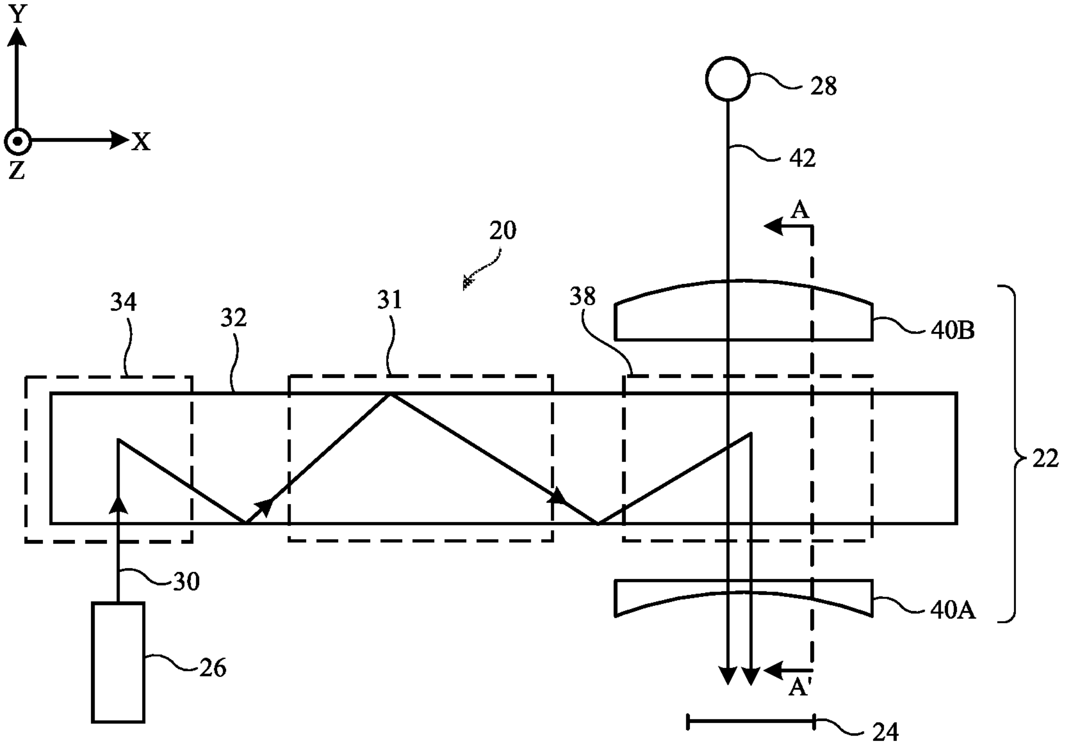
FIG. 2 is a top view of an illustrative optical system for a display having a waveguide with bias lenses for providing a virtual object overlaid with a real-world object at an eye box in accordance with some embodiments.

FIG. 2 is a top view of an illustrative display 20 that may be used in system 10 of FIG. 1. As shown in FIG. 2, display 20 may include a projector such as projector 26 and an optical system such as optical system 22. Optical system 22 may include optical elements such as one or more waveguides 32. Waveguide 32 may include one or more stacked substrates (e.g., stacked planar and/or curved layers sometimes referred to herein as waveguide substrates) of optically transparent material such as plastic, polymer, glass, etc.

If desired, waveguide 32 may also include one or more layers of holographic recording media (sometimes referred to herein as holographic media, grating media, or diffraction grating media) on which one or more diffractive gratings are recorded (e.g., holographic phase gratings, sometimes referred to herein as holograms, surface relief gratings, etc.). A holographic recording may be stored as an optical interference pattern (e.g., alternating regions of different indices of refraction) within a photosensitive optical material such as the holographic media. The optical interference pattern may create a holographic phase grating that, when illuminated with a given light source, diffracts light to create a three-dimensional reconstruction of the holographic recording. The holographic phase grating may be a non-switchable diffractive grating that is encoded with a permanent interference pattern or may be a switchable diffractive grating in which the diffracted light can be modulated by controlling an electric field applied to the holographic recording medium. Multiple holographic phase gratings (holograms) may be recorded within (e.g., superimposed within) the same volume of holographic medium if desired. The holographic phase gratings may be, for example, volume holograms or thin-film holograms in the grating medium. The grating medium may include photopolymers, gelatin such as dichromated gelatin, silver halides, holographic polymer dispersed liquid crystal, or other suitable holographic media.

Diffractive gratings on waveguide 32 may include holographic phase gratings such as volume holograms or thin-film holograms, meta-gratings, or any other desired diffractive grating structures. The diffractive gratings on waveguide 32 may also include surface relief gratings (SRGs) formed on one or more surfaces of the substrates in waveguide 32 (e.g., as modulations in thickness of a SRG medium layer), gratings formed from patterns of metal structures (e.g., meta structures or surfaces), etc. The diffractive gratings may, for example, include multiple multiplexed gratings (e.g., holograms) that at least partially overlap within the same volume of grating medium (e.g., for diffracting different colors of light and/or light from a range of different input angles at one or more corresponding output angles according to the Bragg matching conditions of the holograms). Other light redirecting elements such as louvered mirrors may be used in place of diffractive gratings in waveguide 32 if desired.

As shown in FIG. 2, projector 26 may generate (e.g., produce and emit) image light 30 associated with image content to be displayed to eye box 24 (e.g., image light 30 may convey a series of image frames for display at eye box 24). Image light 30 may be collimated using a collimating lens in projector 26 if desired. Optical system 22 may be used to present image light 30 output from projector 26 to eye box 24. If desired, projector 26 may be mounted within support structure 14 of FIG. 1 while optical system 22 may be mounted between portions of support structure 14 (e.g., to form a lens that aligns with eye box 24). Other mounting arrangements may be used, if desired.

Optical system 22 may include one or more optical couplers (e.g., light redirecting elements) such as input coupler 34, cross-coupler 31, and output coupler 38. In the example of FIG. 2, input coupler 34, cross-coupler 31, and output coupler 38 are formed at or on waveguide 32. Input coupler 34, cross-coupler 31, and/or output coupler 38 may be completely embedded within the substrate layers of waveguide 32, may be partially embedded within the substrate layers of waveguide 32, may be mounted to waveguide 32 (e.g., mounted to an exterior surface of waveguide 32), etc.

Waveguide 32 may guide image light 30 down its length via total internal reflection. Input coupler 34 may be configured to couple image light 30 from projector 26 into waveguide 32 (e.g., within a total-internal reflection (TIR) range of the waveguide within which light propagates down the waveguide via TIR), whereas output coupler 38 may be configured to couple image light 30 from within waveguide 32 (e.g., propagating within the TIR range) to the exterior of waveguide 32 and towards eye box 24 (e.g., at angles outside of the TIR range). Input coupler 34 may include an input coupling prism, an edge or face of waveguide 32, a lens, a steering mirror or liquid crystal steering element, diffractive grating structures (e.g., volume holograms, SRGs, etc.), partially reflective structures (e.g., louvered mirrors), or any other desired input coupling elements.

As an example, projector 26 may emit image light 30 in direction +Y towards optical system 22. When image light 30 strikes input coupler 34, input coupler 34 may redirect image light 30 so that the light propagates within waveguide 32 via total internal reflection towards output coupler 38 (e.g., in direction +X within the TIR range of waveguide 32). When image light 30 strikes output coupler 38, output coupler 38 may redirect image light 30 out of waveguide 32 towards eye box 24 (e.g., back along the Y-axis). In implementations where cross-coupler 31 is formed on waveguide 32, cross-coupler 31 may redirect image light 30 in one or more directions as it propagates down the length of waveguide 32 (e.g., towards output coupler 38 from a direction of propagation as coupled into the waveguide by the input coupler). In redirecting image light 30, cross-coupler 31 may also perform pupil expansion on image light 30 in one or more directions. In expanding pupils of the image light, cross-coupler 31 may, for example, help to reduce the vertical size of waveguide 32 (e.g., in the Z direction) relative to implementations where cross-coupler 31 is omitted. Cross-coupler 31 may therefore sometimes also be referred to herein as pupil expander 31 or optical expander 31. If desired, output coupler 38 may also expand image light 30 upon coupling the image light out of waveguide 32.

Input coupler 34, cross-coupler 31, and/or output coupler 38 may be based on reflective and refractive optics or may be based on diffractive (e.g., holographic) optics. In arrangements where couplers 34, 31, and 38 are formed from reflective and refractive optics, couplers 34, 31, and 38 may include one or more reflectors (e.g., an array of micromirrors, partial mirrors, louvered mirrors, or other reflectors). In arrangements where couplers 34, 31, and 38 are based on diffractive optics, couplers 34, 31, and 38 may include diffractive gratings (e.g., volume holograms, surface relief gratings, etc.).

The example of FIG. 2 is merely illustrative. Optical system 22 may include multiple waveguides that are laterally and/or vertically stacked with respect to each other. Each waveguide may include one, two, all, or none of couplers 34, 31, and 38. Waveguide 32 may be at least partially curved or bent if desired. One or more of couplers 34, 31, and 38 may be omitted. If desired, optical system 22 may include a single optical coupler that performs the operations of both cross-coupler 31 and output coupler 38 (sometimes referred to herein as an interleaved coupler, a diamond coupler, or a diamond expander) or cross-coupler 31 may be separate from output coupler 38.

The operation of optical system 22 on image light 30 is shown in FIG. 2. In addition, output coupler 38 may form an optical combiner for image light 30 and world light 42 from real-world objects such as real-world object 28. As shown in FIG. 2, world light 42 from real-world object 28 may pass through output coupler 38, which transmits the world light (e.g., without diffracting the world light) to eye box 24 (e.g., overlaid with image light 30).

Image light 30 may include images of virtual objects, sometimes referred to herein as virtual object images, virtual images, or simply as virtual objects. Projector 26 may receive image data that includes the virtual object images (e.g., pixels of image data at different pixel locations that form the virtual object images). Output coupler 38 may serve to overlay the virtual object images with world light 42 from real-world object 28 within the field of view (FOV) of eye box 24. The control circuitry for system 10 may provide image data to projector 26 that places the virtual object images at desired locations within the FOV at eye box 24 (e.g., such that the virtual object images are overlaid with desired real-world objects in the scene/environment in front of system 10).

Optical system 22 may include one or more lenses 40 that overlap output coupler 38 (sometimes referred to herein as bias lens(es) 40). For example, optical system 22 may include at least a first lens 40A and a second lens 40B. Lens 40B may be interposed between waveguide 32 and real-world object 28 (e.g., the scene or environment in front of device 10). Lens 40A may be interposed between waveguide 32 and eye box 24 (e.g., the user's eye while wearing device 10). Lenses 40 are transparent and allow world light 42 from real-world object 28 to pass to eye box 24 for viewing by the user. At the same time, the user can view virtual object images in the image light 30 directed out of waveguide 32 and through lens 40A to eye box 24.

The strength (sometimes referred to as the optical power, power, or diopter) of lens 40A can be selected to place virtual object images in image light 30 at a desired image distance (depth) from eye box 24 (sometimes referred to herein as a virtual object distance, virtual object image distance, virtual image distance (VID), virtual object depth, virtual image depth, or image depth). For example, it may be desirable to place virtual objects (virtual object images) such as text, icons, moving images, characters, effects, or other content or features at a certain virtual image distance (e.g., to integrate the virtual object image within, onto, into, or around the real-world objects in front of system 10). The placement of the virtual object at that distance can be accomplished by appropriate selection of the strength of lens 40A. Lens 40A may be a negative lens for users whose eyes do not have refraction errors. The strength (larger net negative power) of lens 40A can therefore be selected to adjust the distance (depth) of the virtual object. Lens 40A may therefore sometimes be referred to herein as bias lens 40A or bias− (B−) lens 40A.

If desired, lens 40B may have a complementary power value (e.g., a positive power with a magnitude that matches the magnitude of the negative power of lens 40A). Lens 40B may therefore sometimes be referred to herein as bias+ (B+) lens 40B, complementary lens 40B, or compensation lens 40B. For example, if lens 40A has a power of −2.0 diopter, lens 40B may have an equal and opposite power of +2.0 diopter (as an example). In this type of arrangement, the positive power of lens 40B cancels the negative power of lens 40A. As a result, the overall power of lenses 40A and 40B taken together will be 0 diopter. This allows a viewer to view real-world objects such as real-world object 28 without optical influence from lenses 40A and 40B. For example, a real-world object 28 located far away from system 10 (effectively at infinity), may be viewed as if lenses 40A and 40B were not present.

For a user with satisfactory uncorrected vision, this type of complementary lens arrangement therefore allows virtual objects to be placed in close proximity to the user (e.g., at a virtual image distance of 0.5-5 m, at least 0.1 m, at least 1 m, at least 2 m, less than 20 m, less than 10 m, less than 5 m, or other suitable near-to-midrange distance from device 10 while simultaneously allowing the user to view real world objects without modification by the optical components of the optical system). For example, a real-world object located at a distance of 2 m from device 10 (e.g., a real-world object being labeled by a virtual text label at a virtual image distance of 2 m) will optically appear to be located 2 m from device 10. This is merely illustrative and, if desired, lenses 40A and 40B need not be complementary lenses (e.g., lenses 40A and 40B may have any desired optical powers).

In addition, some users may require vision correction. Vision correction may be provided using tunable lenses, fixed (e.g., removable) lenses (sometimes referred to as supplemental lenses, vision correction lenses, removable lenses, or clip-on lenses), and/or by adjusting the optical power of lens 40A and/or lens 40B to implement the desired vision correction. In general, the vision correction imparted to the lens(es) may include corrections for ametropia (eyes with refractive errors) such as lenses to correct for nearsightedness (myopia), corrections for farsightedness (hyperopia), corrections for astigmatism, corrections for skewed vision, corrections to help accommodate age-related reductions in the range of accommodation exhibited by the eyes (sometimes referred to as presbyopia), and/or other vision disorders.

Lenses 40A and 40B may be provided with any desired optical powers and any desired shapes (e.g., may be plano-convex lenses, plano-concave lenses, plano-freeform lenses, freeform-convex lenses, freeform-concave lenses, convex-concave lenses, etc.). Implementations in which the optical power(s) of lenses 40A and/or 40B are fixed (e.g., upon manufacture) are described herein as an example. If desired, one or both of lenses 40A and/or 40B may be electrically adjustable to impart different optical powers or power profiles over time (e.g., lenses 40A and/or 40B may be adjustable/tunable liquid crystal lenses).

Figure 3:
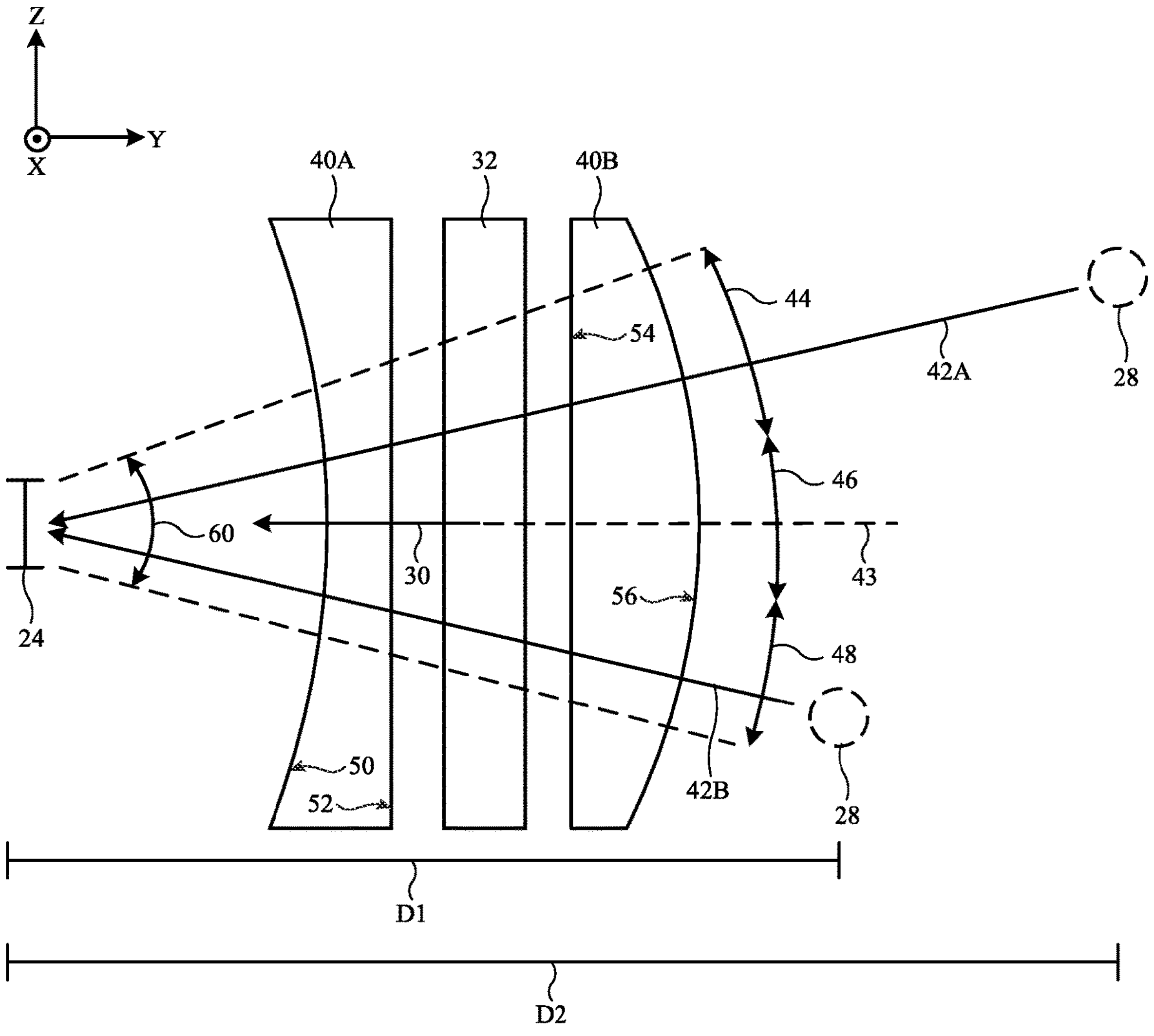
FIG. 3 is a cross-sectional side view showing how objects may be viewed at different image depths for different elevation angles within a field of view of an eye box in accordance with some embodiments.

FIG. 3 is a cross-sectional side view (e.g., taken in the direction of line AA' of FIG. 2) showing how eye box 24 may receive world light 42 and image light 30 through waveguide 32. As shown in FIG. 3, lens 40A may have a first surface 52 facing waveguide 32 and a second surface 50 opposite first surface 52 and facing eye box 24. Lens 40B may have a first surface 54 facing waveguide 32 and a second surface 56 opposite first surface 54 and facing real-world objects 28. Surfaces 50, 52, 54, and 56 may be planar, convex, concave, spherically curved, aspherically curved, freeform curved, toroidally curved, elliptically curved, may exhibit compound curvatures in which different portions of the surface(s) are provided with different ones of these or other curvatures, etc.

Lens 40A may provide image light 30 coupled out of waveguide 32 (e.g., by output coupler 38 of FIG. 2) to eye box 24 within the field of view (FOV) 60 of eye box 24. World light 42 may pass to eye box 24 within FOV 60 and may also pass to the user-facing side of lens 40A outside of FOV 60. World light 42 may, for example, be viewable to the user's eye when the user's eye is not located within eye box 24 (whereas image light 30 is not viewable to the user's eye when the user's eye is not located within eye box 24).

The vergence-accommodation conflict (VAC) is a documented phenomenon regarding the comfort of viewing three-dimensional images generated by near-to-eye displays such as system 10. Some systems (e.g., extended-reality (XR) systems) mitigate VAC by placing virtual objects at a fixed virtual image distance (VID), where lens 40A is provided with a focal length that places the virtual objects at the fixed VID and the fixed VID is selected to minimize viewing discomfort when viewing the virtual objects projected within the working range of the system. In such systems, VAC is generally greatest at short VIDs such as 0.5 m or less.

In augmented reality systems such as optical system 22 of FIGS. 2 and 3 in which the virtual object image is superimposed over real-world objects 28, a focus conflict arises when a virtual object image at a first VID is superimposed over a real-world object 28 that is located at a different distance from eye box 24. For example, it may not be possible for the eye to focus on both the virtual object image and the real-world object, even in a monocular context.

However, in most every day real-world conditions, real-world objects 28 in the lower part of the FOV 60 of eye box 24 tend to be closer to eye box 24 than objects in the upper part of the FOV 60 of eye box 24. For example, real-world objects 28 located at relatively low elevation angles such as angles within low-elevation-angle portion (subset) 48 of FOV 60 (e.g., negative elevation angles that are less than a first threshold angle with respect to optical axis 43 of lenses 40A and 40B) may typically be located at a relatively close distance such as distance D1 from eye box 24. Portion 48 of FOV 60 may therefore sometimes be referred to herein as near-field portion 48 or low angle portion 48 of FOV 60. Eye box 24 may receive world light 42B from real-world objects 28 located within near-field portion 48 of FOV 60 (e.g., external objects often or typically located at relatively close distances such as distance D1).

On the other hand, real-world objects 28 located at relatively high elevation angles such as angles within high-elevation-angle portion (subset) 44 of FOV 60 (e.g., positive elevation angles that are greater than a second threshold angle with respect to optical axis 43) may typically be located at a relatively far distance such as distance D2 from eye box 24. Portion 44 of FOV 60 may therefore sometimes be referred to herein as far-field portion 48 or high angle portion 44 of FOV 60. Eye box 24 may receive world light 42A from real-world objects 28 located within far-field portion 44 of FOV 60 (e.g., external objects often or typically located at relatively far distances such as distance D2). Real-world objects 28 may also be present within intermediate-elevation-angle portion (subset) 46 of FOV 60 (e.g., elevation angles at and around optical axis 43 that are less than the elevation angles associated with far-field portion 44 but greater than the elevation angles associated with near-field portion 48 of FOV 60). Real-world objects 28 located within intermediate portion 46 of FOV 60 may typically or often be located at intermediate distances between distances D1 and D2.

Consider one practical example in which a user of device 10 is reading a book, the book is held in hand at around D1=0.5 m from the observer and occupies the lower portion of the FOV (e.g., near-field portion 48), whereas the background scene at D2=10-100+ m from the observer is located in the upper part of the FOV (e.g., far-field portion 44). As another example, when a user is driving a car, the lower portion of the driver's FOV (e.g., near-field portion 48) is occupied by controls and displays for the car, which are located around D1=40 cm from the driver. On the other hand, the car directly ahead of the driver is typically located around the middle of the FOV (e.g., within intermediate portion 46) and around 10 m from the driver, and the background scene is located around the top of the FOV (e.g., within far-field portion 44) and around D2=10-100+ m from the driver. As yet another example, when an observer is manipulating or preparing ingredients for a meal in their kitchen, the ingredients are typically within arm's reach (e.g., within D1=40 cm) and within the bottom portion of the observer's FOV (e.g., near-field portion 48). The observer may be following a written or displayed recipe that is just out of arm's length (e.g., around 70 cm) and that occupies the middle of the observer's FOV (e.g., intermediate portion 46). At the same time, the observer may be watching television or observing children in the background at a distance of D2=several meters, occupying the top portion of the observer's FOV (e.g., far-field portion 44).

In some implementations, lens 40A has a fixed virtual image distance (VID) that is invariant (constant) across all of field of view 60. This configures the virtual object images in image light 30 to be provided to eye box 24 at the same fixed VID regardless of the angular location of the virtual object image within FOV 60. However, real-world objects 28 will often be present at distances that are different from the fixed VID unless located at or around an elevation angle of zero degrees. This means that for other portions of the FOV, it is very likely that real-world object 28 will be at a different distance from eye box 24 than the virtual object image at the fixed VID, the user will be unable to properly focus on both the virtual object image and the real-world object such that one of the two objects will appear out of focus, and the display will cause viewing discomfort for the user. At the same time, if desired, lenses 40A and/or 40B may be used to provide a progressive prescription to allow the user to view real-world objects 28 at different distances with respect to eye box 24 (e.g., to allow the user to properly and comfortably focus on real-world objects 28 within near-field portion 48 at a relatively close distance, real-world objects 28 within far-field portion 44 at a relative far distance, and real world objects within transition portion 46 at intermediate distances).

To help mitigate these issues, lens 40A and/or lens 40B may exhibit a progressive prescription in which the lens(es) exhibit different optical powers at different elevation angles or in different regions of FOV 60 (e.g., the lens(es) may be configured to impart image light 30 and/or world light 42 with different optical powers at different points within the eye box and/or at different angles within FOV 60). The different optical powers may, for example, configure lens 40A to provide virtual object images at different respective VIDs within the different regions of FOV 60 (e.g., at least within regions 44, 46, and 48) to more closely match the expected location of real-world objects 28, and/or to configure lenses 40A and 40B to collectively allow a user to focus on real-world objects 28 from world light 42 within the different regions of FOV 60 (e.g., at least within regions 44, 46, and 48), thereby minimizing focus conflict and viewing discomfort (e.g., even if the user requires a progressive prescription to view real-world objects 28).

Figure 4:
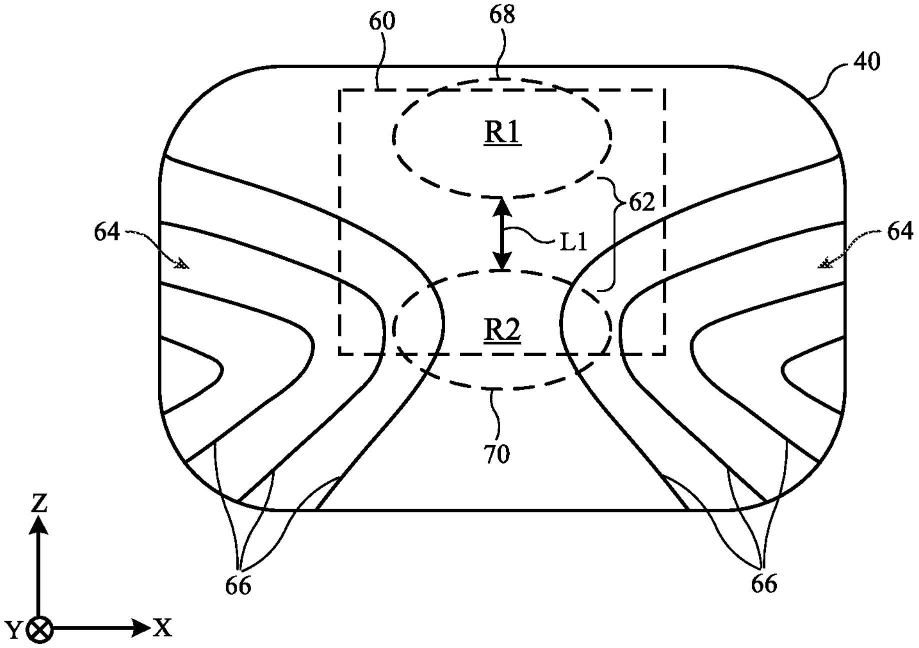
FIG. 4 is a front view showing how illustrative bias lens(es) may be provided with a far-field region with a first optical power within a first portion of a field of view, a near-field region with a second optical power within a second portion of the field of view, a corridor of constant astigmatism extending from the far-field region to the near-field region, and blending regions between the far-field and near-field regions and extending around the corridor of constant astigmatism in accordance with some embodiments.
Figure 5:
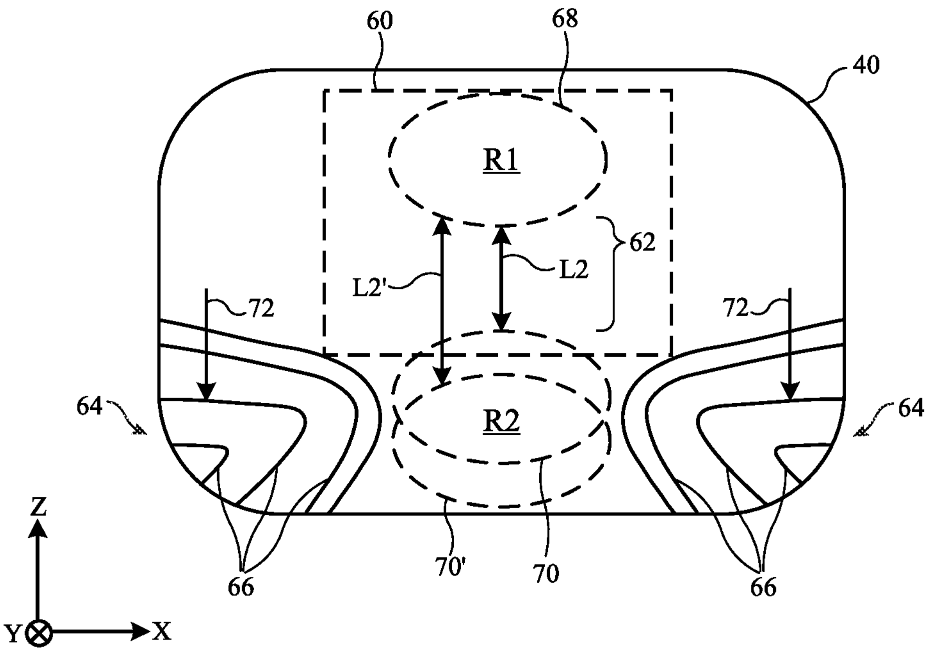
FIG. 5 is a front view showing how illustrative bias lens(es) may be provided with a geometry that optimizes display performance by extending a corridor of constant astigmatism, lowering a near-field region, and/or moving blending regions outside the field of view of an eye box in accordance with some embodiments.

FIGS. 4 and 5 show a front view of lens(es) 40 (e.g., lens 40A and/or 40B, as viewed from eye box 24) showing how the geometry of the lens(es) may be configured to provide different optical powers within different spatial regions of the lens(es) (e.g., for imparting image light and/or world light transmitted through the lenses with different optical powers depending on where in the FOV the light passes through the lens(es)). The geometry shown in FIG. 4 may represent the curvature(s) of surface 50 of lens 40A, surface 52 of lens 40A, surface 54 of lens 40B, and/or surface 56 of lens 40B (e.g., any combination of one or more of surfaces 50, 52, 54, and/or 56 may be provided with different curvatures in different regions/portions of the surfaces to configure the surfaces to collectively exhibit the geometry of lens(es) 40 as shown in FIGS. 4 and 5). In a simplest case, a single one of surfaces 50, 52, 54, or 56 is provided with different curvatures that produce the geometry and the optical effects of lens(es) 40 as shown in FIGS. 4 and 5. However, more generally, two or more (e.g., all) of surfaces 50, 52, 54, and 56 may be provided with different curvatures that collectively produce the geometry and the optical effects of lens(es) 40 as shown in FIGS. 4 and 5.

As shown in FIG. 4, lens(es) 40 may have a first region 68 (e.g., extending across a first lateral area of lens(es) 40) that is provided with a first radius of curvature R1 and may have a second region 70 (e.g., extending across a second lateral area of lens(es) 40) that is provided with a second radius of curvature R2 that is different from (e.g., less than) radius of curvature R1. The FOV 60 of eye box 24 may overlap some but not all of the lateral surface of lens(es) 40.

Region 68 may overlap far-field portion 44 (FIG. 3) of FOV 60 (e.g., the subset of angles within FOV 60 at which real-world objects 28 are typically located relatively far away from eye box 24). Region 68 may therefore sometimes be referred to herein as far-field region 68 of lens(es) 40. World light 42A of FIG. 3 may, for example, pass to eye box 24 through far-field region 68 of lens(es) 40. Radius of curvature R1 may configure far-field region 68 of lens(es) 40 to exhibit a first optical power (e.g., a first focal length). In other words, radius of curvature R1 may configure far-field region 68 of lens(es) 40 to impart world light 42A of FIG. 3 with the first optical power upon transmission through lens(es) 40. This may allow real-world objects 28 located at relatively far distances (e.g., distance D2 of FIG. 3) and viewed through far-field region 68 to appear focused at eye box 24

Region 70 may overlap near-field portion 48 (FIG. 3) of FOV 60 (e.g., the subset of angles within FOV 60 at which real-world objects 28 are typically located relatively close to eye box 24). Region 70 may therefore sometimes be referred to herein as near-field region 70 of lens(es) 40. World light 42B of FIG. 3 may, for example, pass to eye box 24 through near-field region 70 of lens(es) 40. Radius of curvature R2 may configure near-field region 70 of lens(es) 40 to exhibit a second optical power that is different from (e.g., greater than) the first optical power (e.g., to exhibit a second focal length that is less than the first focal length). In other words, radius of curvature R2 may configure near-field region 70 of lens(es) 40 to impart world light 42B of FIG. 3 with the second optical power upon transmission through lens(es) 40. This may allow real-world objects 28 located at relatively close distances (e.g., distance D1 of FIG. 3) and viewed through near-field region 70 to appear focused at eye box 24.

Lens(es) 40 may also have a corridor region 62 that extends from far-field region 68 to near-field region 70. Corridor region 62 may, for example, overlap intermediate portion 46 (FIG. 3) of FOV 60 (e.g., the subset of angles within FOV 60 at which real-world objects 28 are typically located at intermediate distances to eye box 24). Corridor region 62 may have a corresponding length L1 extending along its longitudinal axis from far-field region 68 to near-field region 70. Corridor region 62 may exhibit a gradient optical power along length L1 from the first optical power (at far-field region 68) to the second optical power (at near-field region 70). At the same time, lens(es) 40 exhibit constant astigmatism within corridor region 62 (e.g., from far-field region 68 to near-field region 70). Corridor region 62 may therefore sometimes be referred to herein as a corridor (region) of constant astigmatism, a corridor (region) of gradient optical power, a constant astigmatism corridor (region), a gradient optical power corridor (region), a corridor (region) of constant astigmatism and gradient power, or a constant astigmatism gradient power corridor (region) of lens(es) 40.

Lens(es) 40 may also include blending regions 64 that are laterally located between near-field region 70 and far-field region 68 and around (surrounding) at least a portion of both sides of corridor region 62. Blending regions 64 may sometimes also be referred to herein as boundary regions 64, progressive blending regions 64, or transition regions 64. Blending regions 64 exhibit changing (non-constant or variable) astigmatism, as illustrated by the multiple isometric lines of constant astigmatism 66 within each blending region 64.

Blending regions 64 can produce substantial astigmatism to light that passes through lens(es) 40 within blending regions 64. In the example of FIG. 4, a substantial portion of FOV 60 overlaps blending regions 64 (e.g., one or more isometric lines of constant astigmatism 66). If care is not taken, the presence of blending regions 64 within FOV 60 can introduce unsightly aberrations to the image light 30 that passes through FOV 60 (as well as to world light 42 passing through FOV 60).

To mitigate these issues, the geometry of lens(es) 40 can be shaped such that blending regions 64 do not overlap any or a substantial portion of FOV 60. FIG. 5 is a diagram showing an example of how the geometry of lens(es) 40 can be configured such that blending regions 64 do not overlap any or a substantial portion of FOV 60. As shown in FIG. 5, the geometry of lens(es) 40 can be selected to place near-field region 70 (having radius of curvature R2) farther away from far-field region 68 (having radius of curvature R1). This may form a corridor region 62 having extended length L2 that is greater than length L1 of FIG. 4. Additionally or alternatively, the geometry (e.g., curvatures across the lateral/optical surface(s)) of lens(es) 40 may be selected such that the isometric lines of constant astigmatism 66 of blending regions 64 lie substantially or entirely outside of FOV 60 (e.g., all or most of blending regions 64 may lie entirely or substantially outside of FOV 60).

Near-field region 70 may at least partially overlap FOV 60 (e.g., corridor region 62 may be elongated to exhibit length L2 as shown in FIG. 5) or may, if desired, be non-overlapping with respect to FOV 60, as shown by near-field region 70' (e.g., corridor region 62 may be further elongated to exhibit length L2' as shown in FIG. 5). In this way, blending regions 64 and the isometric lines of constant astigmatism 66 of blending regions 64 may be lowered (e.g., as shown by arrows 72) to lie substantially or completely outside of FOV 60, such that lens(es) 40 do not produce undesirable chromatic aberrations to the image light and world light passing through FOV 60, thereby optimizing the optical performance of device 10 (e.g., maximizing visual acuity at the lower corners of FOV 60 for viewing virtual and real world objects presented within near-field portion 48 of FOV 60 as shown in FIG. 3).

The example of FIGS. 4 and 5 are merely illustrative. The lateral outline of lens(es) 40 (e.g., in the X-Z plane) may have any desired shape. Optical power may be added to region(s) of one or more of surfaces 50, 52, 54, and/or 56 of lens(es) 40 (FIG. 3) to produce the optical geometry shown in FIGS. 4 and 5. Blending regions 64 may have other shapes in practice. Isometric lines of constant astigmatism 66 may have other shapes. Any combination of the elongation of corridor region 62, the reduction in elevation angle of near-field region 70, and/or the shaping of blending regions 64 may be used to optimize the optical performance of device 10 in this way. FOV 60 may have any desired lateral outline and any desired size. The length of corridor region 62 may, for example, be as long as more than 10%, 20%, 30%, 40%, 50%, 60%, or 70% of the height of lens(es) 40 (e.g., along the Z-axis of FIG. 4).

Figure 6:
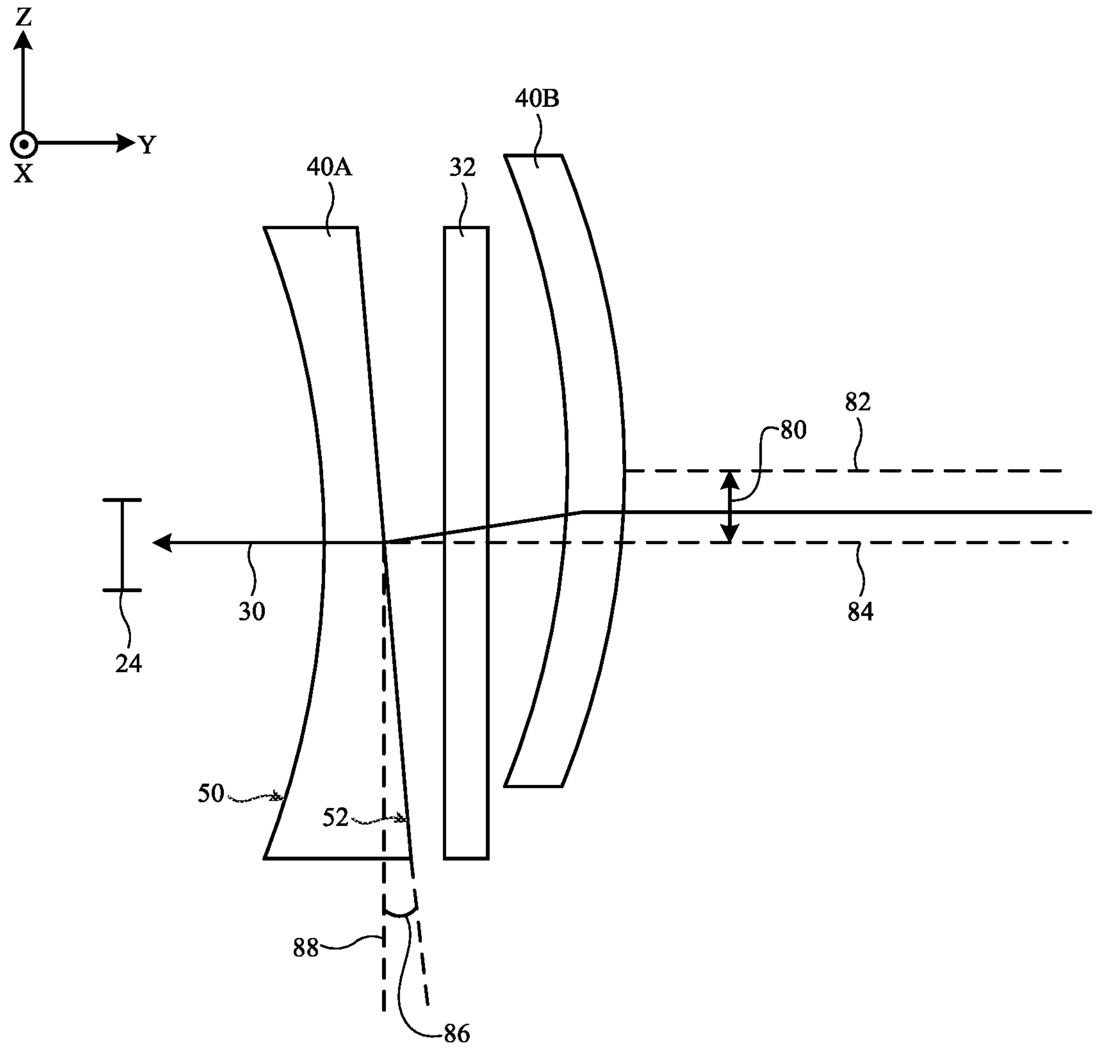
FIG. 6 is a cross-sectional side view showing how illustrative bias lens(es) may be offset with respect to each other and provided with an integrated optical wedge that mitigates the offset in accordance with some embodiments.

In the example of FIGS. 3-5, the optical axis of lenses 40A and 40B are aligned (e.g., co-linear). This is merely illustrative. If desired, lens 40B may be offset with respect to lens 40A. FIG. 6 is a cross-sectional side view showing one example of how lens 40B may be offset with respect to lens 40A. Lenses 40A and 40B of FIG. 6 may have the same geometries (e.g., regions R1, R2, and 64) as lenses 40A and 40B of FIG. 5 or may have other geometries.

As shown in FIG. 6, lens 40A may have an optical axis 84 (e.g., extending through the center of lens 40A, orthogonal to the plane of eye box 24 and parallel to the Y-axis). Lens 40B may have an optical axis 82 (e.g., extending through the center of lens 40B, orthogonal to the plane of eye box 24 and parallel to the Y-axis). When lens 40A is aligned with lens 40B, optical axis 84 is co-linear with optical axis 86.

In practice, lens 40A may be misaligned or offset with respect to lens 40B. In these implementations, optical axis 82 is offset or misaligned with respect to optical axis 84 by offset 80. This offset may be due to requirements given by the form factor of system 10 (e.g., to accommodate the presence of other components and/or to allow system 10 to be comfortably worn on a user's head) and/or to accommodate a particular interpupillary distance (IPD) of the user.

If care is not taken, offset 80 may cause undesirable refraction of the world light relative to the image light and/or eye box 24. This may cause some of the light to reach eye box 24 at an incorrect position/angle, may cause world light from undesired angles to be directed to eye box 24, may cause misalignment between virtual objects and real world objects when viewed at the eye box, and/or may cause undesirable light loss.

To mitigate these issues, an optical wedge may be incorporated into lens 40. The optical wedge may mitigate or counteract refraction of the world light by lens 40B (e.g., world light 42 of FIG. 3). Lens 40A may, for example, include an optical wedge having surface 52 (e.g., a planar surface) that is tilted or oriented at a non-parallel angle 86 with respect to the lateral surface of waveguide 32 (e.g., plane 88). Angle 86 may be selected to counteract any prismatic bending of the world light transmitted by lens 40B due to the non-zero offset 80 (e.g., decentration) of lens 40A relative to lens 40B. Angle 86 may be 10-20 degrees, 5-30 degrees, 1-45 degrees, or other angles.

If desired, the projector may distort, warp, or otherwise adjust the image data used to generate image light 30 in a manner that compensates for or mitigates any bending of image light 30 by the tilted surface 52 of lens 40A. Additionally or alternatively, one or more diffractive gratings may be layered onto surface 52 (e.g., a planar surface, a curved surface, or a surface tilted at angle 86). The diffractive grating(s) (e.g., surface relief gratings, volume holograms, thin film holograms, metasurfaces, etc.) may diffract the world light transmitted by lens 40B onto output angles that serve to compensate for or reverse any prismatic bending of the world light after transmission through lens 40B given offset 80 (e.g., the diffractive grating(s) may perform similar redirection of the world light via diffraction as performed via refraction by tilting surface 52 by angle 86). If desired, a combination of refraction (e.g., tilting surface 52) and diffraction may be used to redirect the light towards eye box 24.

The foregoing is merely illustrative and various modifications can be made to the described embodiments. The foregoing embodiments may be implemented individually or in any combination.

What is claimed is:

1. An electronic device comprising:

a waveguide configured to propagate first light;

an optical coupler configured to couple the first light out of the waveguide within a field of view (FOV) and configured to transmit second light from an external object; and a lens overlapping the optical coupler and having a surface configured to transmit at least the second light, the surface comprising:

a first region with a first radius of curvature, a second region with a second radius of curvature that is different from the first radius of curvature, a corridor region that laterally extends from the first region to the second region and that has a constant astigmatism, and blending regions around the corridor region, wherein the blending regions are non-overlapping with respect to the FOV.

2. The electronic device of claim 1, wherein the corridor region has a gradient optical power.

3. The electronic device of claim 2, wherein the blending regions have non-constant astigmatism.

4. The electronic device of claim 3, wherein each of the blending regions has a respective plurality of isometric lines of constant astigmatism that lie outside of the FOV.

5. The electronic device of claim 1, further comprising:

an additional lens overlapping the optical coupler and configured to transmit the first light and the second light within the FOV, the waveguide being interposed between the lens and the additional lens.

6. The electronic device of claim 5, wherein the surface of the lens faces away from the waveguide.

7. The electronic device of claim 1, further comprising:

an additional lens overlapping the optical coupler and configured to transmit the second light to the optical coupler, wherein the surface of the lens is configured to transmit the first light and the second light within the FOV.

8. The electronic device of claim 7, wherein the surface faces away from the waveguide.

9. The electronic device of claim 1, wherein the first region of the surface overlaps a first set of elevation angles of the FOV at a first side of an optical axis of the lens, the second region of the surface overlaps a second set of elevation angles of the FOV that are at a second side of the optical axis of the lens, and the first radius of curvature is greater than the second radius of curvature.

10. The electronic device of claim 1, wherein an entirety of the second region lies outside the FOV.

11. The electronic device of claim 1, wherein the first region is configured to transmit the second light within a first portion of the FOV and the second region is configured to transmit the second light within a second portion of the FOV at lower elevation angles than the first portion of the FOV.

12. The electronic device of claim 11, wherein the corridor region has a gradient optical power.

13. The electronic device of claim 12, wherein the first region has a first optical power, the second region has a second optical power, and the gradient optical power varies from the first optical power at the first region to the second optical power at the second region.

14. The electronic device of claim 13, wherein the blending regions exhibit variable astigmatism.

15. The electronic device of claim 13, wherein the second optical power is greater than the first optical power and the blending regions extend along opposing sides of the corridor region.

16. The electronic device of claim 1, wherein the optical coupler comprises a surface relief grating.

17. The electronic device of claim 1, wherein the optical coupler comprises a louvered mirror.

18. The electronic device of claim 1, wherein the optical coupler comprises volume holograms.

19. An optical system comprising:

a waveguide configured to propagate first light;

an optical coupler configured to couple the first light out of the waveguide within a field of view (FOV) and configured to transmit second light from an external object; and a lens overlapping the optical coupler and having a surface configured to transmit at least the second light, the surface comprising:

a first region with a first radius of curvature and configured to transmit the second light within a first portion of the FOV, a second region with a second radius of curvature that is different from the first radius of curvature and configured to transmit the second light within a second portion of the FOV at lower elevation angles than the first portion of the FOV, a corridor region that extends from the first region to the second region and that has a constant astigmatism, and blending regions around the corridor region, wherein the blending regions have variable astigmatism and are non-overlapping with respect to the FOV.

20. An electronic device comprising:

a waveguide configured to propagate first light;

an optical coupler configured to couple the first light out of the waveguide within a field of view (FOV) and configured to transmit second light from an external object; and a lens overlapping the optical coupler and having a surface configured to transmit at least the second light, the surface comprising:

a first region with a first radius of curvature, a second region with a second radius of curvature that is different from the first radius of curvature, a corridor region that laterally extends from the first region to the second region and that has a constant astigmatism, and blending regions around the corridor region, wherein each of the blending regions has a respective plurality of isometric lines of constant astigmatism that lie outside of the FOV.

* * * * *